United States Patent Office 3,793,315

Patented Feb. 19, 1974

3,793,315
TRIAZOLE DERIVATIVES

Adolf Emil Siegrist, Basel, Switzerland, assignor to Ciba-Geigy AG, Basel, Switzerland No Drawing. Filed Sept. 30, 1971, Ser. No. 185,424
Claims priority, application Switzerland, Oct. 1, 1970, 14,514/70
Int. Cl. C07d 55/02
U.S. Cl. 260—240 C 15 Claims

ABSTRACT OF THE DISCLOSURE

The invention deals with new triazole derivatives of the formula

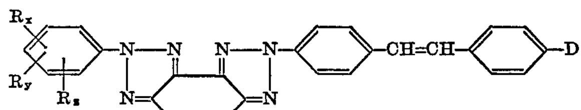

wherein D denotes a radical from the group of benzoxazol-2-yl, 1,3,4 - oxadiazol-2-yl, benztriazol-2-yl, naphth-[1,2-d] - triazol - 2 - yl and benzo[1,2-d:3,4-d']-bis-triazol-2-yl, and these radicals can contain 1 to 3 substituents from the group of halogen, alkyl with at least 2 carbon atoms or methyl in the case of benzoxazol-2-yl radical, alkoxy, phenoxy, phenyl, phenylalkyl, cycloalkyl or a methylenedioxy group and $R_x$, $R_y$ and $R_z$ are identical or different and denote hydrogen, halogen, alkyl with at least 2 carbon atoms or alkoxy, and furthermore $R_x$ can represent phenyl or phenylalkyl and $R_x$ together with $R_y$ can form a methylenedioxy group.

Furthermore the invention concerns a process for preparation by means of the "anile-synthesis." The compounds are valuable fluorescent whitening agents.

The present invention relates to new stilbenyl derivatives of benzo[1,2-d:3,4-d']-bis-triazole, a novel process for their manufacture and their use.

The new compounds are characterized in that the structural element (1)

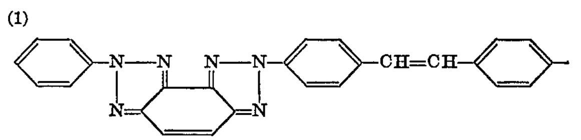

is substituted, at the stilbenyl unit, by specific ring systems containing 5-membered heterocyclic rings.

The new compounds according to the above general characteristic thus correspond to the general formula (2)

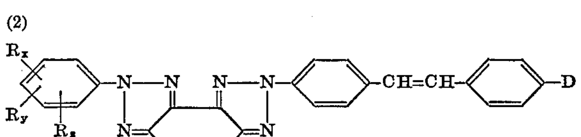

wherein D denotes a radical from the group of benzoxazol - 2 - yl, 1,3,4 - oxadiazol - 2 - yl, benztriazol-2-yl, naphth[1,2-d] - triazol - 2 -yl and benzo[1,2-d:3,4-d']-bis-triazol-2-yl, and these radicals can contain 1 to 3 substituents from the group of halogen, alkyl with at least 2 carbon atoms or methyl in the case of the benzoxazol-2-yl radical, alkoxy, phenoxy, phenyl, phenylalkyl, cycloalkyl or a methylenedioxy group and $R_x$, $R_y$ and $R_z$ are identical or different and denote hydrogen, halogen, alkyl with at least 2 carbon atoms or alkoxy, and furthermore $R_x$ can represent phenyl or phenylalkyl and $R_x$ together with $R_y$ can form a methylenedioxy group.

The manufacturing process according to the invention for compounds of the Formula 2 is characterized in that Schiff's bases of the formula (3)

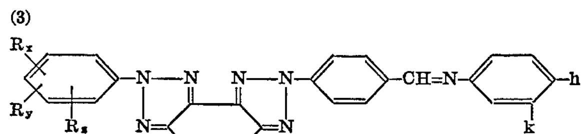

are reacted, in a molar ratio of about 1:1, with a compound of the formula (4)

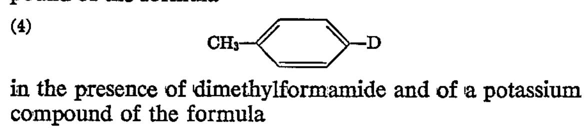

in the presence of dimethylformamide and of a potassium compound of the formula $$(5) \qquad KOC_{x-1}H_{2x-1}$$

with $R_x$, $R_y$, $R_z$ and D in these formulae having the above-mentioned meaning, $h$ and $k$ being identical or different and representing hydrogen, chlorine or methoxy and $x$ representing an integer from 1 to 6.

For practical purposes, those triazole derivatives according to Formula 2 are above all of interest which correspond to the formula (6)

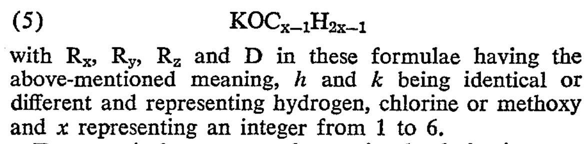

wherein $D_1$ denotes a radical of the formulae

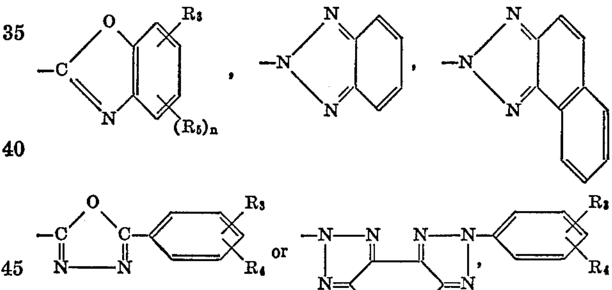

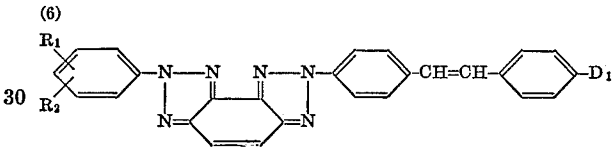

wherein $R_1$ and $R_3$ are identical or different and denote hydrogen, chlorine, an alkyl group containing 2 to 4 carbon atoms or an alkoxy group containing 1 to 4 carbon atoms, phenyl or phenylalkyl with 1 to 4 carbon atoms in the alkyl part and $R_3$ can also denote a methyl group if $R_3$ is present in the benzoxazole radical, $R_2$ and $R_4$ are identical or different and represent hydrogen, chlorine, alkyl with 2 to 4 carbon atoms or alkoxy with 1 to 4 carbon atoms, $R_5$ represents hydrogen or an alkyl group containing 1 to 8 carbon atoms and $n$ represents the numbers 1 to 3.

The compounds according to the Formula 6 can be manufactured in an analogous manner to that indicated for the Formula 2, by reacting a Schiff's base of the formula (7)

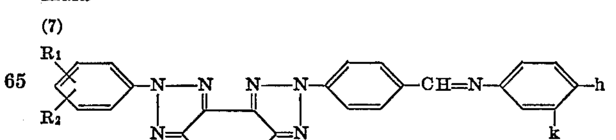

with a compound of the formula (8)

$$CH_3-C_6H_4-D_1$$

with $R_1$, $R_2$, *h*, *k* and $D_1$ in these formulae having the above-mentioned meaning.

From the point of view of application for optical brightening of spinning compositions—especially based on polyesters—the sub-groups of compounds listed below are of preferred interest:

(a) Triazole derivatives of the formula (9)

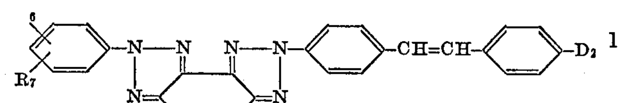

wherein $D_2$ denotes a radical of the formulae

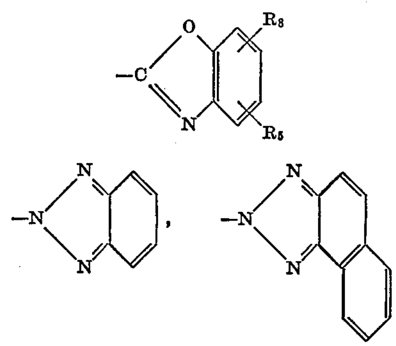

wherein $R_6$ and $R_8$ are identical or different and denote hydrogen, chlorine, an alkyl group containing 2 to 4 carbon atoms, methoxy, a p-phenyl group or a 5-phenyl group and $R_8$ can also denote a methyl group in the case where it is present as a substituent in the benzoxazole radical, $R_7$ and $R_9$ are identical or different and represent hydrogen, alkyl with 2 to 4 carbon atoms, methoxy or ethoxy and $R_5$ denotes hydrogen or an alkyl group containing 1 to 8 carbon atoms.

These compounds of the Formula 9 can be manufactured entirely analogously, by reacting a Schiff's base of the formula (10)

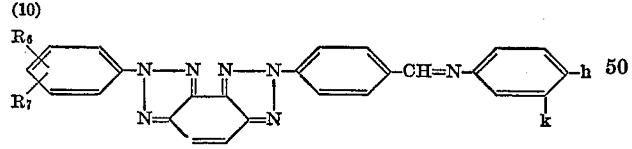

with a compound of the formula (11)

$$CH_3-C_6H_4-D_2$$

wherein the general symbols have the above-mentioned meaning.

(b) Triazole derivatives of the formula (12)

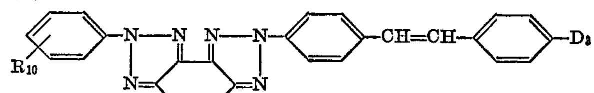

wherein $D_3$ denotes a radical of the formulae

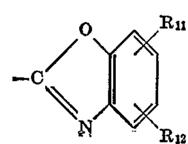

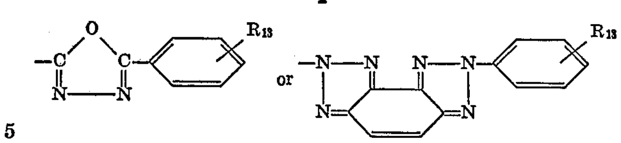

wherein $R_{10}$ represents hydrogen, chlorine, an alkyl group containing 2 to 4 carbon atoms, methoxy, ethoxy or p-phenyl, $R_{11}$ represents hydrogen, chlorine, an alkyl group containing 1 to 4 carbon atoms, methoxy, ethoxy, phenylisopropyl or a 5-phenyl group, $R_{12}$ represents hydrogen, an alkyl group containing 1 to 8 carbon atoms, methoxy or chlorine and $R_{13}$ represents hydrogen, an alkyl group containing 2 to 4 carbon atoms, chlorine or methoxy.

These compounds are obtainable analogously by reaction of a Schiffs base of the formula (13)

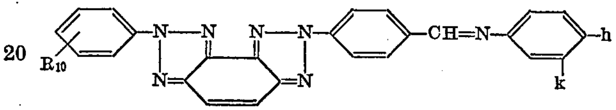

with a compound of the formula (14)

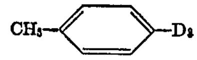

(c) Triazole derivatives of the formula (15)

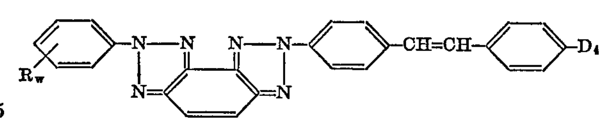

wherein $R_w$ represents hydrogen, methoxy or alkyl with 2 to 4 carbon atoms and $D_4$ denotes a radical of the formulae

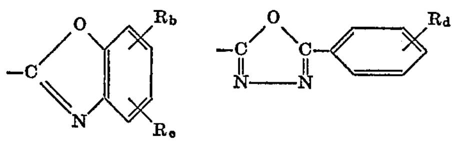

or

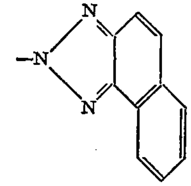

wherein $R_b$ denotes hydrogen, alkyl with 1 to 8 carbon atoms, cyclohexyl, phenylalkyl with 1 to 4 carbon atoms in the alkyl part, alkoxy with 1 to 4 carbon atoms, phenoxy, phenyl or chlorine, $R_c$ denotes hydrogen or alkyl with 1 to 4 carbon atoms and $R_d$ denotes hydrogen, alkyl with 1 to 4 carbon atoms, alkoxy with 1 to 4 carbon atoms, chlorine or phenyl.

(d) Triazole derivatives of the formula (16)

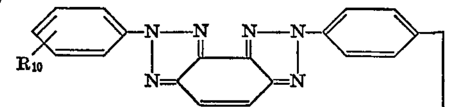

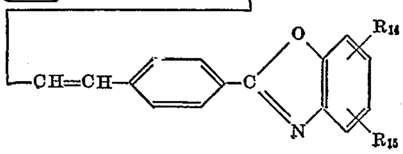

wherein $R_{10}$ represents hydrogen, chlorine, an alkyl group containing 2 to 4 carbon atoms, methoxy, ethoxy or p-phenyl, $R_{14}$ represents hydrogen, methoxy, an alkyl group containing 1 to 4 carbon atoms, a 5-phenyl group or a phenylalkyl group with 1 to 4 carbon atoms in the alkyl part and $R_{15}$ represents hydrogen or an alkyl group containing 1 to 8 carbon atoms.

Compounds of the Formula 15 are manufactured by reacting a Schiff's base of the formula (17)

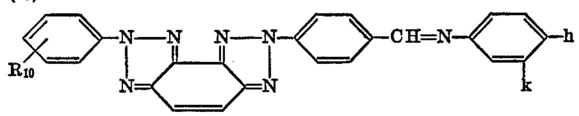

with a compound of the formula (18)

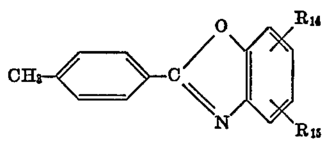

with the symbols in these formulae having the above-mentioned meaning.

(e) Triazole derivatives of the formula (19)

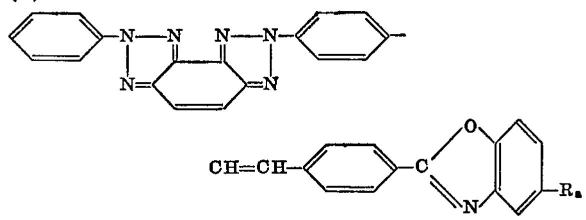

wherein $R_a$ represents hydrogen or the tertiary butyl group, which are again obtainable analogously.

The above-mentioned types of compounds of the Formulae 2, 6, 9, 12, 15, 16 or 19 can also be manufactured by interchanging, between the reaction partners, the functional groups responsible for the synthesis of the stilbene double bond. This synthesis takes place in accordance with the same reaction principle and accordingly under the same reaction conditions. In the case of the manufacture of the compounds according to the Formula 2, the synthesis consists of reacting a Schiff's base of the formula (20)

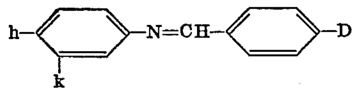

in the molar ratio of about 1:1 with a compound of the formula (21)

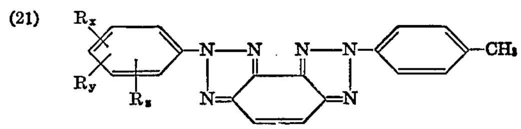

in the presence of dimethylformamide and of a potassium compound of the formula $$KOC_{x-1}H_{2x-1}$$

with $R_x$, $R_y$, $R_z$ and D having the abovementioned meaning, *h* and *k* being identical or different and representing hydrogen, chlorine or methoxy and *x* representing an integer from 1 to 6.

This synthesis has, for example, proved of value for the manufacture of compounds of the formula (22)

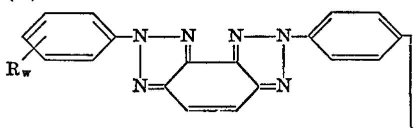

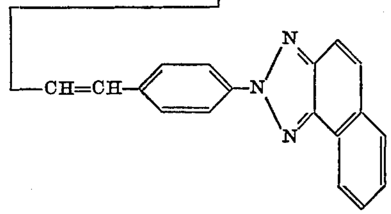

wherein $R_w$ represents hydrogen, methoxy or alkyl with 2 to 4 carbon atoms, by reacting a compound of the formula (23)

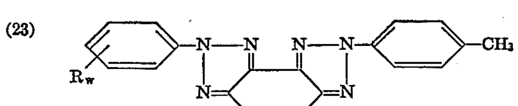

with an anil of the formula (24)

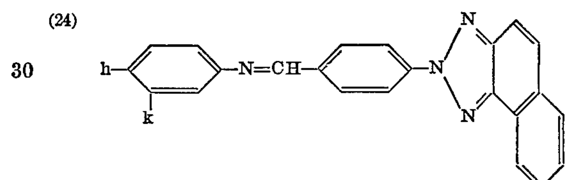

wherein *h* and *k* have the above-mentioned meaning.

A general rule for the Schiff's base to be used as the second reactant in the present manufacturing process is, in accordance with the basic reaction principle, that the Schiff's base must be free of reactive methyl groups or of groups capable of salt formation. These Schiff's bases are the reaction products, which are in themselves known, of aldehydes of aromatic radicals, as defined in more detail above, with primary amines. Though these primary amines can in themselves be of aliphatic, carbocyclic-aromatic or heterocyclic nature with the amino group bonded to a tertiary carbon atom, hardly any others than aniline or its easily available derivatives are considered, for economic reasons. This is mainly due to the fact that the amine radical is split off during the reaction and is no longer present in the end product. Accordingly, it is entirely possible for the amine radical to contain substituents which do not interfere with the reaction or which, like, for example, chlorine atoms, even accelerate the reaction.

The reactants carrying methyl groups (for example of the Formulae 4, 8, 11, 14, 18 and the like) are reacted with the Schiff's bases in the presence of dimethylformamide as the solvent.

Additionally, a strongly basic alkali compound is required for the reaction. By strongly basic alkali compounds there are to be understood, within the framework of the present invention, those compounds of the alkali metals (Main Group I of the Periodic System of the Elements) including compounds of ammonium, which have a base strength of at least approximately that of lithium hydroxide. Accordingly, these may be compounds of lithium, sodium, potassium, rubidium, caesium or ammonium of the type of, for example, the alcoholates, hydroxides, amides, hydrides or sulphides, or strongly basic ion exchangers. For practical reasons (above all if mild reaction conditions, as regards the reaction temperature, appear indicated) potassium compounds of the composition (5) $$KOC_{x-1}H_{2x-1}$$

are normally used, wherein $x$ represents an integer from 1 to 6, such as, for example, potassium hydroxide or potassium tertiary-butylate. In the case of alkali alcoholates and alkali amides (and hydrides) the reaction must be carried out in a practically anhydrous medium, whilst in the case of alkali hydroxides water contents of up to 25% (for example the presence of water of crystallization) are permitted. In the case of potassium hydroxide, a water content of up to about 15% has proved suitable. As examples of other usable alkali compounds there may be mentioned sodium methylate, sodium hydroxide, sodium amide, lithium amide, lithium hydroxide, rubidium hydroxide, caesium hydroxide and the like. Of course it is also possible to work with mixtures of such bases.

Appropriately, the reactants containing methyl groups are reacted with the Schiff's bases in the stoichiometric rato of 1:1, so that no significant excess of either component is present. Advantageously, at least the equivalent amount of the alkali compound is used, that is to say at least 2 mols of a compound with, for example, a KO group, per one mol of Schiff's base. When using potassium hydroxide, a 4-fold to 8-fold amount is preferably used.

The reaction according to the invention can generally be carried out at temperatures in the range of between about 10 and 150° C. If alcoholates are used as the potassium compound in the reaction, the reaction frequently already succeeds at room temperature, in which case no external supply of heat is necessary. When using potassium hydroxide it is in most cases necessary to carry out the process at a higher temperature. For example, the reaction mixture is slowly warmed to 30 to 100° C. and is then kept at this temperature for some time, for example ½ to 2 hours. The final substances can be worked up from the reaction mixture in accordance with customary methods which are in themselves known.

The new compounds defined above show a more or less pronounced fluorescence in the dissolved or finely divided state. They can be used for the optical brightening of the most diverse synthetic or semi-synthetic materials, or substances which contain such organic materials.

The following groups of organic materials, where optical brightening thereof is relevant, may be mentioned as examples of the above, without the survey given below being intended to express any restriction thereto:

(I) Synthetic organic high molecular materials:

(a) Polymerization products based on organic compounds containing at least one polymerizable carbon-carbon double bond, that is to say their homopolymers or copolymers as well as their after-treatment products such as, for example, crosslinking, grafting or degradation products, polymer blends or products obtained by modification of reactive groups, for example polymers based on $\alpha,\beta$-unsaturated carboxylic acids or derivatives of such carboxylic acids, especially on acrylic compounds (such as, for example, acrylic esters, acrylic acid, acrylonitrile, acrylamides and their derivatives or their methacryl analogues), on olefine hydrocarbons (such as, for example, ethylene, propylene, styrenes or dienes and also so-called ABS polymers), and polymers based on vinyl and vinylidene compounds (such as, for example, vinyl chloride, vinyl alcohol or vinylidene chloride), (b) Polymerization products such as are obtainable by ring opening, for example, polyamides of the polycaprolactam type, and also polymers which are obtainable both via polyaddition and via polycondensation, such as polyethers or polyacetals, (c) Polycondensation products or precondensates based on bifunctional or polyfunctional compounds possessing condensable groups, their homocondensation and co-condensation products, and after-treatment products, such as, for example, polyesters, especially saturated (for example ethylene glycol terephthalic acid polyesters) or unsaturated (for example maleic acid dialcohol polycondensates as well as their crosslinking products with copolymerizable vinyl monomers), unbranched or branched (also based on higher functional alcohols, such as, for example, alkyd resins) polyesters, polyamides (for example hexamethylenediamine adipate), maleate resins, melamine resins, their precondensates and analogues, polycarbonates and silicones, (d) Polyaddition products, such as polyurethanes (crosslinked and non-crosslinked) and epoxide resins.

(II) Semi-synthetic organic materials, for example cellulose esters of varying degrees of esterification (so-called 2½-acetate or triacetate) or cellulose ethers, regenerated cellulose (viscose or cuprammonium cellulose), or their after-treatment products, and casein plastics:

The organic materials to be optically brightened can be in the most diverse states of processing (raw materials, semi-finished goods or finished goods). On the other hand, they can be in the form of structures of the most diverse shapes, that is to say, for example, predominantly three-dimensional bodies such as sheets, profiles, injection mouldings, various machined articles, chips, granules or foams, and also predominantly two-dimensional bodies such as films, foils, lacquers, coatings, impregnations and laminations, or predominantly one-dimensional bodies, such as filaments, fibres, flocks and wires. The said materials can, on the other hand, also be in an unshaped state, in the most diverse homogeneous or inhomogeneous forms of division, such as, for example, in the form of powders, solutions, emulsions, dispersions, latices, pastes or waxes.

Fibre materials can, for example, be in the form of endless filaments (stretched or unstretched), staple fibres, flocks, hanks, textile filaments, yarns, threads, fibre fleeces, felts, waddings, flocked structures or woven textile fabrics or textile laminates, knitted fabrics and papers, cardboards or paper compositions.

The compounds to be used according to the invention are of importance, inter alia, for the treatment of organic textile materials, especially woven textile fabrics. Where fibres, which can be in the form of staple fibres or endless filaments or in the form of hanks, woven fabrics, knitted fabrics, fleeces, flocked substrates or laminates, are to be optically brightened according to the invention, this is advantageously effected in an aqueous medium, wherein the compounds in question are present in a finely divided form (suspensions, so-called micro-dispersions or possibly solutions). If desired, dispersing agents, stabilizers, wetting agents and further auxiliaries can be added during the treatment.

Depending on the type of brightener compound used, it may prove advantageous to carry out the treatment in a neutral or alkaline or acid bath. The treatment is usually carried out at temperatures of about 20 to 140° C., for example at the boiling point of the bath or near it (about 90° C.). Solutions or emulsions in organic solvents can also be used for the finishing, according to the invention, of textile substrates, as is practiced in the dyeing trade in so-called solvent dyeing (pad-thermofix application, or exhaustion dyeing processes in dyeing machines).

The new optical brighteners according to the present invention can further be added to, or incorporated in, the materials before or during their shaping. Thus, they can for example be added to the compression moulding composition or injection moulding composition during the manufacture of films, sheets (for example milling into hot polyvinyl chloride) or mouldings.

Where fully synthetic or semi-synthetic organic materials are being shaped by spinning processes or via spinning compositions, the optical brighteners can be applied in accordance with the following processes:

Addition to the starting substances (for example monomers) or intermediates (for example precondensates or prepolymers), that is to say before or during the polymerization, polycondensation or polyaddition.

Powdering onto polymer chips or granules for spinning compositions.

Bath dyeing of polymer chips or granules for spinning compositions.

Metered addition to spinning melts or spinning solutions, and

Application to the tow before stretching.

The new optical brighteners according to the present invention can, for example, also be employed in the following use forms:

(a) Mixed with dyestuffs (shading) or pigments (colored or, especially, for example white pigments).

(b) Mixed with so-called "carriers," wetting agents, plasticizers, swelling agents, anti-oxidants, light protection agents and heat stabilizers.

(c) Mixed with crosslinking agents or finishes (for example starch or synthetic finishes), and in combination with the most diverse textile finishing processes, especially synthetic resin finishes (for example creaseproof finishes such as "wash-and-wear," "permanent-press" or "no-iron"), as well as flameproof finishes, soft handle finishes, anti-soiling finishes or antistatic finishes, or anti-microbial finishes.

(d) Incorporation of the optical brighteners into polymeric carriers (polymerization, polycondensation or polyaddition products), in a dissolved or dispersed form, for use, for example, in coating compositions, impregnating compositions or binders (solutions, dispersions and emulsions) for textiles, fleeces, paper and leather.

(e) As additives to so-called "master batches."

(f) As additives to the most diverse industrial products in order to render these more marketable (for example improving the appearance of pigments).

(g) In combination with other optically brightening substances.

(h) In spinning bath preparations, that is to say as additives to spinning baths such as are used for improving the slip for the further processing of synthetic fibres, or from a special bath before the stretching of the fibre.

If the brightening process is combined with textile treatment methods or finishing methods, the combined treatment can in many cases advantageously be carried out with the aid of appropriate stable preparations, which contain the optically brightening compounds in such concentration that the desired brightening effect is achieved.

In certain cases, the brighteners are made fully effective by an after-treatment. This can, for example, represent a chemical treatment (for example acid treatment), a thermal treatment (for example heat) or a combined chemical/thermal treatment. Thus, for example, the appropriate procedure to follow in optically brightening a series of fibre substrates, for example polyester fibres, with the brighteners according to the invention is to impregnate these fibres with the aqueous dispersions (or, where appropriate, solutions) of the brighteners at temperatures below 75° C., for example at room temperature, and to subject them to a dry heat treatment at temperatures above 100° C., it being generally advisable additionally to dry the fibre material beforehand at a moderately elevated temperature, for example at not less than 60° C. and up to about 130° C. The heat treatment in the dry state is then advantageously carried out at temperatures between 120 and 225° C., for example by heating in a drying chamber, by ironing within the specified temperature range or by treatment with dry, superheated steam. The drying and dry heat treatment can also be carried out in immediate succession or be combined in a single process stage.

The amount of the new optical brighteners to be used according to the invention, relative to the material to be optically brightened, can vary within wide limits. A distinct and durable effect is already achievable with very small amounts, in certain cases, for example, amounts of 0.0001 percent by weight. However, amounts of up to about 0.8 percent by weight and at times up to about 2 percent by weight can also be employed. For most practical purposes, amounts between 0.0005 and 0.5 percent by weight are of preferred interest.

In the examples, the parts, unless otherwise stated, are always parts by weight and the percentages are always percentages by weight. Unless otherwise stated, melting points and boiling points are uncorrected.

EXAMPLE 1

5.62 g. of the Schiff's base of the formula

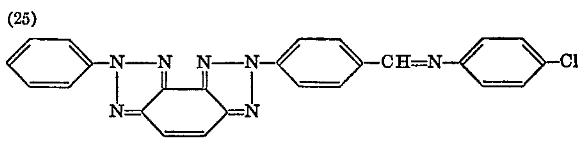

2.62 g. of 4-(benzoxazol-2-yl)-toluene of the formula

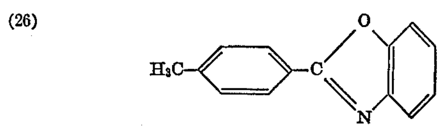

and 3.2 g. of potassium hydroxide powder containing about 10% of water, in 150 ml. of dimethylformamide, are stirred whilst excluding air. The temperature is brought to 60° C. over the course of 30 minutes, in the course of which a dark violet coloration appears. The reaction mixture is stirred for a further 60 minutes at 60 to 65° C., 300 ml. of methanol are thereafter added, and the whole is cooled to 0° C. The product which has precipitated is filtered off, washed with 400 ml. of methanol and dried. 5.3 g., corresponding to 82.7% of theory, of the compound of the formula

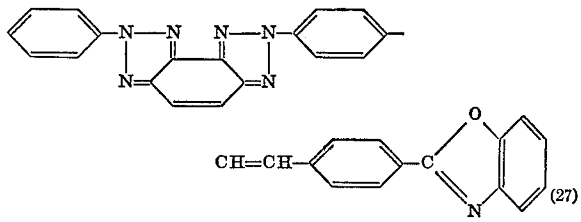

are obtained in the form of a light yellow powder of melting point 353 to 355° C. On recrystallizing twice from o-dichlorobenzene (fuller's earth), 3.5 g. (54.7% of theory) of light yellow, very fine crystals melting at 354 to 355° C. are obtained.

*Analysis.*—Calculated for $C_{33}H_{21}N_7O$ (531.58) (percent): C, 74.56; H, 3.98; N, 18.44. Found (percent): C, 74.39; H, 3.85; N, 18.72.

The compound of the formula

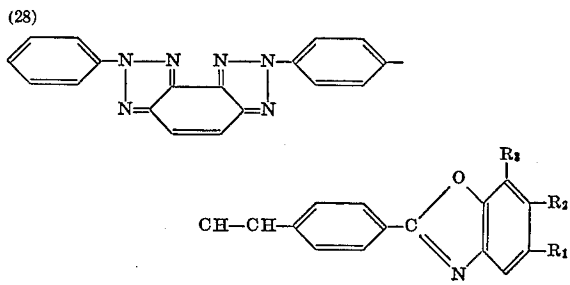

listed in the table which follows can be prepared in a similar manner:

| Number | $R_1$ | $R_2$ | $R_3$ | Melting point, ° C. |
|---|---|---|---|---|
| 29 | $-CH_3$ | $-CH_3$ | H | 358-359 |
| 30 | $-CH_3$ | H | $-CH_3$ | 320-321 |
| 31 | H | $-CH_3$ | H | 350-351 |
| 32 | $-CH_2-CH_3$ | H | H | 325-326 |
| 33 | $-C(CH_3)_3$ | H | H | 352-353 |
| 34 | Same as above | H | $-CH_3$ | 288-289 |
| 35 | $-CH_3$ | H | $-C(CH_3)_3$ | 329-330 |
| 36 | $-C(CH_3)_2-CH_2-C(CH_3)_3$ | H | H | 349-350 |
| 37 | $-CH(CH_2-H_2C)_2CH_2$ (cyclohexyl) | H | H | 345-346 |
| 38 | $-CH_2-C_6H_5$ | H | H | 339-340 |
| 39 | $-OCH_3$ | H | H | 338-339 |
| 40 | Cl | H | H | >355 |
| 41 | $-C_6H_5$ | H | H | >355 |
| 42 | H | $-C_6H_5$ | H | 337-338 |
| 43 | H | $-O-C_6H_5$ | H | >355 |

The aldehyde of the formula (44)

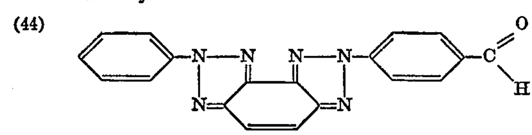

(melting point: 300 to 301° C.), used for the preparation of the Schiff's base of the Formula 25, can be obtained by reaction of the compound of the formula (45)

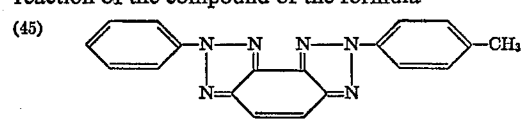

(melting point: 218 to 219° C.) with N-bromosuccinimide and subsequent Sommelet reaction.

EXAMPLE 2

2.25 g. of the Schiff's base of the formula (25)

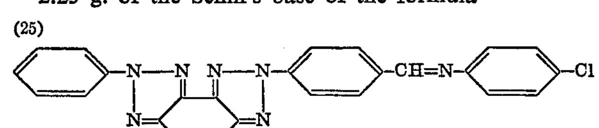

1.25 g. of 2-(p-tolyl)-5-(m-tolyl)-1,3,4-oxadiazole of the formula (46)

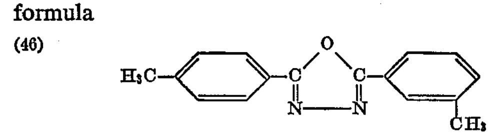

and 1.25 g. of potassium hydroxide powder containing about 10% of water are reacted in 70 ml. of dimethylformamide in accordance with the instructions of Example 1. 2.2 g., corresponding to 78.6% of theory, of the compound of the formula (47)

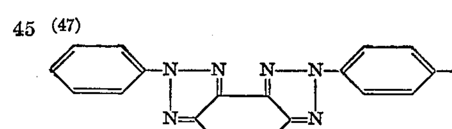

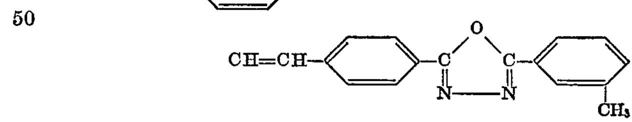

are obtained in the form of a yellow powder of melting point 306 to 307° C. On recrystallizing twice from o-dichlorobenzene, 1.2 g. (42.9% of theory) of light greenish-tinged yellow, very fine crystals, melting at 317 to 318° C., are obtained.

*Analysis.*—$C_{35}H_{24}N_8O$ (572.63) (percent): Calculated for C, 73.41; H, 4.22; N, 19.57. Found (percent): C, 73.18; H, 4.17; N, 19.60.

The compounds of the formula (48)

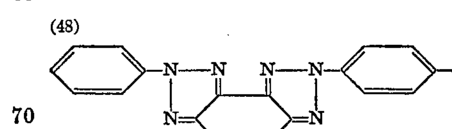

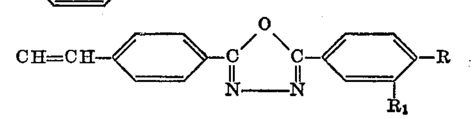

listed in the table which follows can be prepared in a similar manner:

| Number | $R_1$ | $R_2$ | Melting point, ° C. |
|---|---|---|---|
| 49 | H | H | 341-342 |
| 50 | $-OCH_3$ | H | 301-302 |
| 51 | H | Cl | 350 |
| 52 | H | | 350 |

EXAMPLE 3

4.79 g. of the Schiff's base of the formula (53)

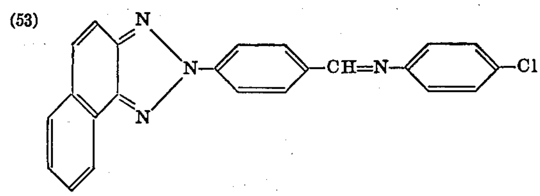

(melting point: 223 to 224° C.), 4.45 g. of 2-(m-methoxyphenyl) - 7 - (p-tolyl)-benzo[1,2-d:3,4-d']-bis-triazole of the formula (54)

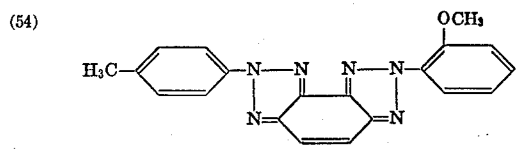

(melting point: 189.5 to 190° C.) and 3.1 g. of potsassium hydroxide powder containing about 10% of water are reacted in 150 ml. of dimethylformamide in accordance with the instructions of Example 1. 3.1 g., corresponding to 40.8% of theory, of the compound of the formula (55)

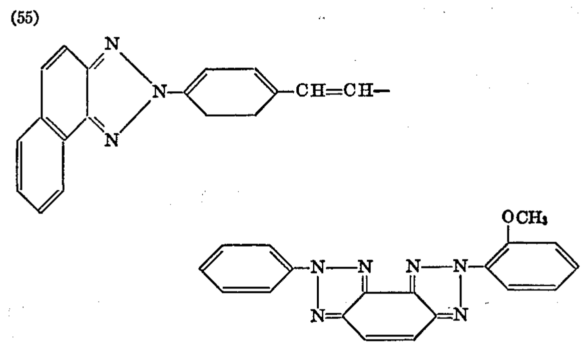

are obtained in the form of a yellow powder which melts at 292 to 295° C. On recrystallizing twice from o-dichlorobenzene (fuller's earth), 1.8 g. (23.7% of theory) of greenish-tinged yellow, fine small needles of melting point 316 to 317° C., are obtained.

*Analysis.*—$C_{37}H_{25}N_9O$ (611.67) (percent): Calculated for C, 72.66; H, 4.12; N, 20.61. Found (percent): C, 72.44; H, 4.13; N, 20.65.

In a similar manner, 2-(p-isopropylphenyl)-7-(p-tolyl)-benzo[1,2-d:3,4-d']-bis-triazole of the formula (56)

(melting point: 213 to 214° C.) yields the compound of the formula (57)

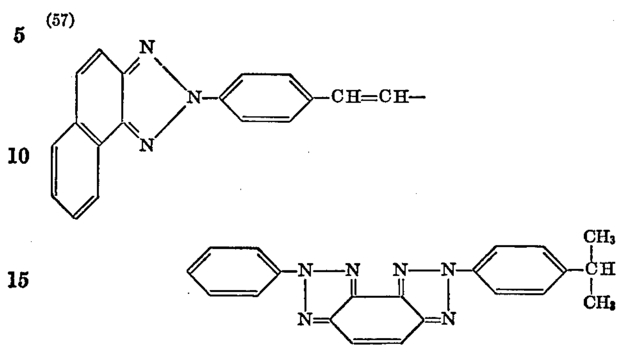

(melting point: >350° C.).

EXAMPLE 4

100 parts of polyester granules of terephthalic acid ethylene glycol polyester are intimately mixed with 0.05 part of one of the compounds of the Formulae 27 or 29 to 43 and fused at 285° C. whilst stirring. After spinning the spinning composition through customary spinnerets, strongly brightened polyester fibres are obtained.

The above-mentioned compounds can also be added to the starting substances before or during the polycondensation to give the polyester.

EXAMPLE 5

10,000 parts of granulated polyamide-6 are mixed with 30 parts of titanium dioxide (rutile modification) and 2 parts of one of the compounds of the Formulae 47 or 49 to 52 in a tumbler vessel for 12 hours. The mixture is fused with exclusion of atmospheric oxygen and the melt is spun in the usual manner. The filaments obtained show a strong brightening effect with good fastness to light.

If, instead of polyamide-6, polyamide-66 is used, similarly strong brightening effects are achieved.

I claim:

1. A triazole compound of the formula

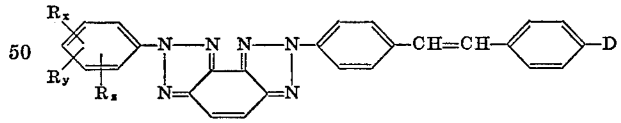

wherein D denotes a radical from the group of benzoxazol-2-yl, 1,3,4-oxadiazol-2-yl, benztriazol-2-yl, naphth[1,2-d]-triazol-2-yl and benzo[1,2-d:3,4-d']-bis-triazol-2-yl, and these radicals can contain 1 to 3 substituents from the group of halogen, alkyl with at least 2 carbon atoms or methyl in the case of the benzoxazol-2-yl radical, alkoxy, phenoxy, phenyl, phenylalkyl, cycloalkyl or a methylenedioxy group and $R_x$, $R_y$ and $R_z$ are identical or different and denote hydrogen, halogen, alkyl with at least 2 carbon atoms or alkoxy, and furthermore $R_x$ can represent phenyl or phenylalkyl and $R_x$ together with $R_y$ can form a methylenedioxy group.

2. A triazole compound according to claim 1 which corresponds to the formula

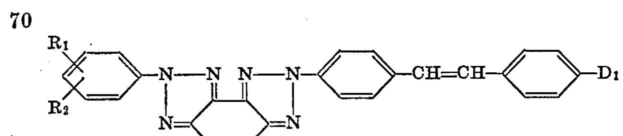

wherein $D_1$ denotes one of the radicals of the formulae

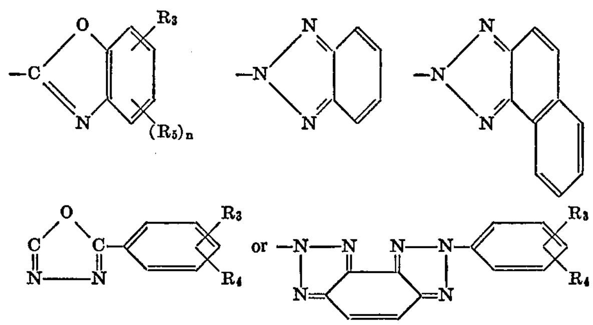

wherein $R_1$ and $R_3$ are identical or different and denote hydrogen, chlorine, an alkyl group containing 2 to 4 carbon atoms or an alkoxy group containing 1 to 4 carbon atoms, phenyl or phenylalkyl with 1 to 4 carbon atoms in the alkyl part and $R_3$ can also denote a methyl group if $R_3$ is present in the benzoxazole radical, $R_2$ and $R_4$ are identical or different and represent hydrogen, chlorine, alkyl with 2 to 4 carbon atoms or alkoxy with 1 to 4 carbon atoms, $R_5$ represents hydrogen or an alkyl group containing 1 to 8 carbon atoms and *n* represents the numbers 1 to 3.

3. A triazole compound according to claim 1 which corresponds to the formula

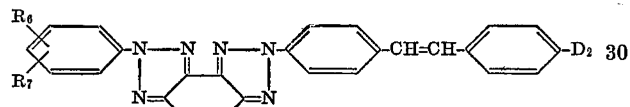

wherein $D_2$ denotes a radical of the formulae

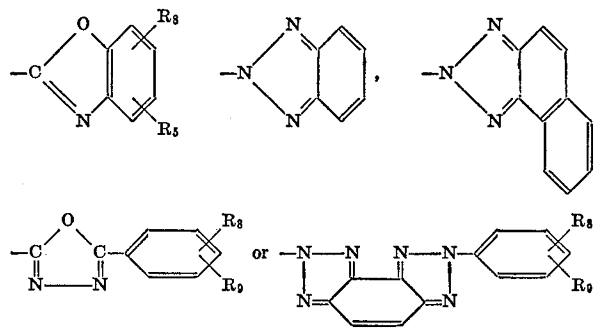

wherein $R_6$ and $R_8$ are identical or different and denote hydrogen, chlorine, an alkyl group containing 2 to 4 carbon atoms, methoxy, a p-phenyl group or a 5-phenyl group and $R_8$ can also denote a methyl group in the case where it is present as a substituent in the benzoxazole radical, $R_7$ and $R_9$ are identical or different and represent hydrogen, alkyl with 2 to 4 carbon atoms, methoxy or ethoxy and $R_5$ denotes hydrogen or an alkyl group containing 1 to 8 carbon atoms.

4. A triazole compound according to claim 1 which corresponds to the formula

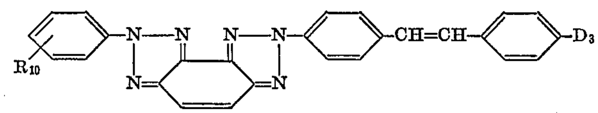

wherein $D_3$ denotes a radical of the formulae

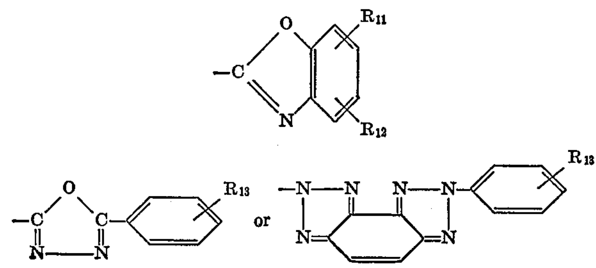

wherein $R_{10}$ represents hydrogen, chlorine, an alkyl group containing 2 to 4 carbon atoms, methoxy, ethoxy or p-phenyl, $R_{11}$ represents hydrogen, chlorine, an alkyl group containing 1 to 4 carbon atoms, methoxy, ethoxy, phenylisopropyl or a 5-phenyl group, $R_{12}$ represents hydrogen, an alkyl group containing 1 to 8 carbon atoms, methoxy or chlorine and $R_{13}$ represents hydrogen, an alkyl group containing 2 to 4 carbon atoms, chlorine or methoxy.

5. A triazole compound according to claim 1 which corresponds to the formula

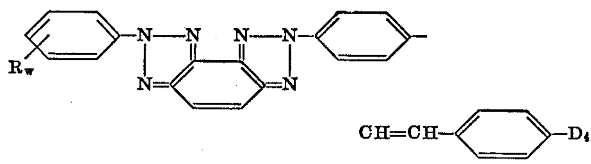

wherein $R_w$ represents hydrogen, methoxy or alkyl with 2 to 4 carbon atoms and $D_4$ denotes a radical of the formulae

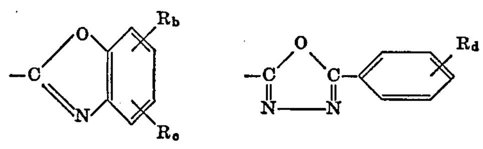

or

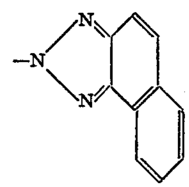

wherein $R_b$ denotes hydrogen, alkyl with 1 to 8 carbon atoms, cyclohexyl, phenylalkyl with 1 to 4 carbon atoms in the alkyl part, alkoxy with 1 to 4 carbon atoms, phenoxy, phenyl or chlorine, $R_c$ denotes hydrogen or alkyl with 1 to 4 carbon atoms and $R_d$ denotes hydrogen, alkyl with 1 to 4 carbon atoms, alkoxy with 1 to 4 carbon atoms, chlorine or phenyl.

6. A triazole compound according to claim 1 which correspond to the formula

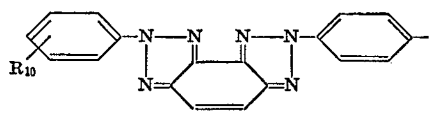

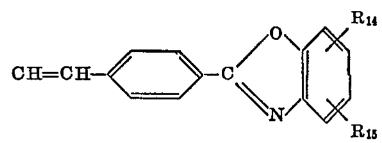

wherein $R_{10}$ represents hydrogen, chlorine, an alkyl group containing 2 to 4 carbon atoms, methoxy, ethoxy or p-phenyl, $R_{14}$ represents hydrogen, methoxy, an alkyl group containing 1 to 4 carbon atoms, a 5-phenyl group or a phenylalkyl group with 1 to 4 carbon atoms in the alkyl part and $R_{15}$ represents hydrogen or an alkyl group containing 1 to 8 carbon atoms.

7. A triazole compound according to claim 1 which corresponds to the formula

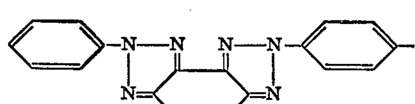

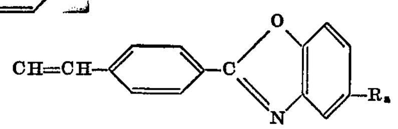

wherein $R_a$ represents hydrogen or the tert. butyl group.

8. A triazole compound of the formula

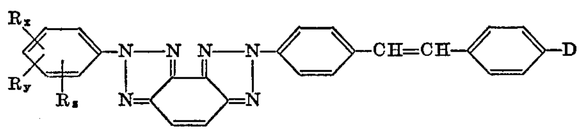

wherein D denotes a radical from the group of benzoxazol-2-yl, unsubstituted or substituted with 1 to 3 substituents from the group of halogen, alkyl, alkoxy, phenoxy, phenyl, phenyl, alkyl, cycloalkyl or a methylenedioxy group and $R_x$, $R_y$ and $R_z$ are identical or different and denote hydrogen, halogen, alkyl with at least 2 carbon atoms or alkoxy, and furthermore $R_x$ can be represent phenyl or phenylalkyl and $R_x$ together with $R_y$ can form a methylenedioxy group.

9. A triazole compound according to claim 8 wherein D denotes one of the radicals of the formula

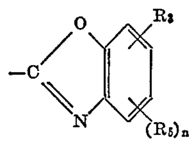

wherein $R_x$ and $R_3$ are identical or different and denote hydrogen, chlorine, an alkyl group containing 2 to 4 carbon atoms or an alkoxy group containing 1 to 4 carbon atoms, phenyl or phenylalkyl with 1 to 4 carbon atoms in the alkyl part and $R_3$ can also denote a methyl group, $R_y$ represents hydrogen, chlorine, alkyl with 2 to 4 carbon atoms or alkoxy with 1 to 4 carbon atoms, $R_z$ is hydrogen, $R_5$ represents hydrogen or an alkyl group containing 1 to 8 carbon atoms and $n$ represents the numbers 1 to 3.

10. A triazole compound according to claim 9 wherein $R_x$ and $R_3$ are identical or different and denote hydrogen, chlorine, an alkyl group containing 2 to 4 carbon atoms, methoxy, a p-phenyl group or a 5-phenyl group and $R_3$ represents hydrogen, alkyl with 2 to 4 carbon atoms, methoxy or ethoxy, $R_z$ is hydrogen, $R_5$ denotes hydrogen or an alkyl group containing 1 to 8 carbon atoms and $n$ is 1.

11. A triazole compound according to claim 9 wherein $R_x$ represents hydrogen, chlorine, an alkyl group containing 2 to 4 carbon atoms, methoxy, ethoxy or p-phenyl, $R_x$ and $R_y$ are hydrogen, $R_z$ represents hydrogen, chlorine, an alkyl group containing 1 to 4 carbon atoms, methoxy, ethoxy, phenylisopropyl or a 5-phenyl group, $R_5$ represents hydrogen, an alkyl group containing 1 to 8 carbon atoms, methoxy or chlorine, and $n$ is 1.

12. A triazole compound according to claim 9 wherein $R_x$ represents hydrogen, methoxy or alkyl with 2 to 4 carbon atoms, $R_x$ and $R_y$ are hydrogen, wherein $R_3$ denotes hydrogen, alkyl with 1 to 8 carbon atoms, cyclohexyl, phenylalkyl with 1 to 4 carbon atoms in the alkyl part, alkoxy with 1 to 4 carbon atoms, phenoxy, phenyl or chlorine, $R_5$ denotes hydrogen or alkyl with 1 to 4 carbon atoms and $n$ is 1.

13. A triazole compound according to claim 9 wherein $R_x$ represents hydrogen, chlorine, an alkyl group containing 2 to 4 carbon atoms, methoxy, ethoxy or p-phenyl, $R_y$ and $R_z$ represent hydrogen, $R_3$ represents hydrogen, methoxy, an alkyl group containing 1 to 4 carbon atoms, a 5-phenyl group or a phenylalkyl group with 1 to 4 carbon atoms in the alkyl part, $R_5$ represents hydrogen or an alkyl group containing 1 to 8 carbon atoms and $n$ is 1.

14. A new triazole compound according to claim 13 wherein $R_x$, $R_y$, $R_z$ and $R_3$ are hydrogen, $R_5$ represents hydrogen or the tert. butyl group and $n$ is 1.

15. A triazole compound according to claim 13 wherein $R_x$, $R_y$, $R_z$, $R_3$, and $R_5$ are hydrogen.

References Cited

UNITED STATES PATENTS 2,462,405 2/1949 Keller et al. ----- 260—240 C X
2,817,665 12/1957 Zweidler et al. --- 260—240 C X

OTHER REFERENCES

Chemical Abstracts, vol. 68, pp. 2119–2120 (Abstract No. 21961h) (1968) (abstract of Netherlands application 6615211 published May 2, 1967).

JOHN D. RANDOLPH, Primary Examiner

U.S. Cl. X.R.

106—176; 117—33.5 T; 252—301.2 W, 543; 260—2 S, 40 P, 40 TN, 41 C, 47 EP, 67.6 R, 75 N, 77.5 D, 78.5 T, 80.3 R, 92.8, 240.9

UNITED STATES PATENT OFFICE

CERTIFICATE OF CORRECTION

Patent No. 3,793,315 Dated February 19, 1974

Inventor(s) ADOLF EMIL SIEGRIST

It is certified that error appears in the above-identified patent and that said Letters Patent are hereby corrected as shown below:

Claim 8, column 17, line 10, change "phenyl, alkyl" to -- phenylalkyl --.

Signed and sealed this 8th day of October 1974.

(SEAL)
Attest:

McCOY M. GIBSON JR.
Attesting Officer

C. MARSHALL DANN
Commissioner of Patents